United States Patent
Zhou et al.

(10) Patent No.: US 11,050,877 B2
(45) Date of Patent: Jun. 29, 2021

(54) METHODS AND APPARATUS FOR BEAM FAILURE DETECTION

(71) Applicant: QUALCOMM Incorporated, San Diego, CA (US)

(72) Inventors: Yan Zhou, San Diego, CA (US); Tao Luo, San Diego, CA (US); Prashanth Haridas Hande, San Diego, CA (US); Makesh Pravin John Wilson, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/452,155

(22) Filed: Jun. 25, 2019

(65) Prior Publication Data

US 2020/0007678 A1 Jan. 2, 2020

Related U.S. Application Data

(60) Provisional application No. 62/693,222, filed on Jul. 2, 2018.

(51) Int. Cl.
*H04M 3/26* (2006.01)
*H04W 72/04* (2009.01)
*H04L 5/00* (2006.01)

(52) U.S. Cl.
CPC ............ *H04M 3/26* (2013.01); *H04L 5/001* (2013.01); *H04W 72/042* (2013.01)

(58) Field of Classification Search
CPC .......... H04M 3/26; H04L 5/001; H04L 5/005; H04L 5/0048; H04L 5/0051; H04L 5/0053; H04W 72/042; H04W 72/02; H04W 72/04
USPC .................................................. 370/216–218
See application file for complete search history.

(56) References Cited

U.S. PATENT DOCUMENTS

| | | | |
|---|---|---|---|
| 2019/0104516 A1* | 4/2019 | Oh ..................... | H04W 72/0413 |
| 2019/0173740 A1* | 6/2019 | Zhang ................ | H04W 72/042 |
| 2019/0253949 A1* | 8/2019 | Park .................... | H04W 36/305 |
| 2019/0306909 A1* | 10/2019 | Zhou ........................ | H04B 7/08 |
| 2020/0100179 A1* | 3/2020 | Zhou ..................... | G06F 1/3209 |
| 2020/0221428 A1* | 7/2020 | Moon ................ | H04W 72/042 |
| 2020/0252180 A1* | 8/2020 | Takeda .................. | H04W 72/04 |
| 2020/0296656 A1* | 9/2020 | Amuru ................ | H04W 48/12 |
| 2020/0389847 A1* | 12/2020 | Deng ................... | H04B 7/0617 |

OTHER PUBLICATIONS

International Search Report and Written Opinion—PCT/US2019/039282—ISA/EPO—dated Jan. 2, 2020.
(Continued)

*Primary Examiner* — Candal Elpenord
(74) *Attorney, Agent, or Firm* — QUALCOMM Incorporated

(57) ABSTRACT

An aspect of the present disclosure includes methods, systems, and computer-readable media for receiving a beam failure detection reference signal configuration, detecting an absence of a configured and quasi-co-located beam failure detection reference signal in a monitored control resource set (CORESET), and utilizing reference signals indicated in the CORESET transmission configuration indicator state for beam failure detection.

21 Claims, 6 Drawing Sheets

(56) References Cited

OTHER PUBLICATIONS

Intel Corporation: "Remaining details of RLM", 3GPP TSG RAN WG1 Meeting #92bis, 3GPP Draft; R1-1804709 Intel RLM, 3rd Generation Partnership Project (3GPP), Mobile Competence Centre; 650, Route Des Lucioles; F-06921 Sophia-Antipolis Cedex; France, vol. RAN WG1, No. Sanya, China; Apr. 15, 2018, pp. 1-5, XP051426976, Retrieved from the Internet: URL: http://www.3gpp.org/ftp/Meetings%5F3GPP%5FSYNC/RAN1/Docs/ [retrieved on Apr. 15, 2018] sections 2, 3.

Intel Corporation: "Summary of Offline Discussion for NR Radio Link Monitoring", 3GPP TSG RAN WG1 Meeting #93, 3GPP Draft; R1-1807853 Summary RLM-FRI, 3rd Generation Partnership Project (3GPP), Mobile Competence Centre; 650, Route Des Lucioles; F-06921 Sophia-Antipolis Cedex; France, vol. RAN WG1, No. Busan, South Korea; May 29, 2018, pp. 1-11, XP051463520, Retrieved from the Internet: URL: http://www.3gpp.org/ftp/tsg%5Fran/WG1%5FRL1/TSGR1%5F93/Docs [retrieved on May 29, 2018] sections 2.1, 2.2, 2.7, 2.8, 3.2, 3.3.

Mediatek: "Summary from Offline for Beam Recovery Mechanism", 3GPP TSG RAN WG1 Meeting #89, 3GPP Draft; R1-1709606 Summary on Beam Recovery Mechanism_V10, 3rd Generation Partnership Project (3GPP), Mobile Competence Centre; 650, Route Des Lucioles; F-06921 Sophia-Antipolis Cedex; France, vol. RAN WG1, No. Hangzhou, China; May 18, 2017, 7 Pages, XP051285306, Retrieved from the Internet: URL: http://www.3gpp.org/ftp/tsg_ran/WG1_RL1/TSGR1_89/Docs/ [retrieved on May 18, 2017] pp. 1-3, 6.

NTT Docomo, et al., "Remaining Issues on RLM for Mobility Management", 3GPP TSG RAN WG1 Meeting #93, 3GPP Draft; R1-1807056_Remaining Issues on RLM for Mobility Management Final, 3rd Generation Partnership Project (3GPP), Mobile Competence Centre; 650, Route Des Lucioles; F-06921 Sophia-Antipolis Cedex; France, vol. Ran WG1, No. Busan, Korea; May 20, 2018, 4 Pages, XP051442254, Retrieved from the Internet: URL: http://www.3gpp.org/ftp/Meetings%5F3GPP%5FSYNC/RAN1/Docs/ [retrieved on May 20, 2018] sections 1-4.

Partial International Search Report—PCT/US2019/039282—ISA/EPO—dated Oct. 10, 2019.

\* cited by examiner

METHODS AND APPARATUS FOR BEAM FAILURE DETECTION

CROSS REFERENCE TO RELATED APPLICATIONS

The present application claims priority to U.S. Provisional Application No. 62/693,222, filed on Jul. 2, 2018, entitled "Methods and Apparatus for Beam Failure Detection," the contents of which are incorporated by reference in their entirety.

BACKGROUND

Aspects of the present disclosure relate generally to wireless communication networks, and more particularly, to apparatus and methods for beam failure detection.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which may be referred to as new radio (NR)) is envisaged to expand and support diverse usage scenarios and applications with respect to current mobile network generations. In an aspect, 5G communications technology may include: enhanced mobile broadband addressing human-centric use cases for access to multimedia content, services and data; ultra-reliable-low latency communications (URLLC) with certain specifications for latency and reliability; and massive machine type communications, which may allow a very large number of connected devices and transmission of a relatively low volume of non-delay-sensitive information. As the demand for mobile broadband access continues to increase, however, further improvements in NR communications technology and beyond may be desired.

In a communication network, a user equipment (UE) may perform beam failure detection to assess the integrity of the transmitted signals from the base station (BS). However, certain resources may not be properly configured, due to latency for example, and difficult to be used by the UE for beam failure detection. Therefore, improvements in beam failure detection methods may be desired.

SUMMARY

The following presents a simplified summary of one or more aspects in order to provide a basic understanding of such aspects. The summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects of the present disclosure include methods for receiving a beam failure detection reference signal configuration, detecting an absence of a configured and quasi-co-located beam failure detection reference signal in a monitored control resource set (CORESET), and utilizing reference signals indicated in the CORESET transmission configuration indicator state for beam failure detection.

Other aspects of the present disclosure include apparatuses having a memory, a transceiver, and one or more processors communicatively coupled with the memory and the transceiver, the one or more processors are configured to perform the steps of receiving a beam failure detection reference signal configuration, detecting an absence of a configured and quasi-co-located beam failure detection reference signal in a monitored CORESET, and utilizing reference signals indicated in the CORESET transmission configuration indicator state for beam failure detection.

Some aspects of the present disclosure include non-transitory computer readable media having instructions stored therein that, when executed by one or more processors, cause the one or more processors to perform the steps of receiving a beam failure detection reference signal configuration, detecting an absence of a configured and quasi-co-located beam failure detection reference signal in a monitored CORESET, and utilizing reference signals indicated in the CORESET transmission configuration indicator state for beam failure detection.

Aspects of the present disclosure include methods for receiving a beam failure detection reference signal configuration, detecting an absence of a configured and quasi-co-located beam failure detection reference signal in a monitored CORESET, and utilizing demodulation reference signals of the CORESET or decoding statistics of physical downlink control channel carried by the CORESET to evaluate a CORESET quality for beam failure detection.

Other aspects of the present disclosure include apparatuses having a memory, a transceiver, and one or more processors communicatively coupled with the memory and the transceiver, the one or more processors are configured to perform the steps of receiving a beam failure detection reference signal configuration, detecting an absence of a configured and quasi-co-located beam failure detection reference signal in a monitored CORESET, and utilizing demodulation reference signals of the CORESET or decoding statistics of physical downlink control channel carried by the CORESET to evaluate a CORESET quality for beam failure detection.

Some aspects of the present disclosure include non-transitory computer readable media having instructions stored therein that, when executed by one or more processors, cause the one or more processors to perform the steps of receiving a beam failure detection reference signal configuration, detecting an absence of a configured and quasi-co-located beam failure detection reference signal in a monitored CORESET, and utilizing demodulation reference signals of the CORESET or decoding statistics of physical downlink control channel carried by the CORESET to evaluate a CORESET quality for beam failure detection.

Aspects of the present disclosure include methods for receiving a beam failure detection (BFD) reference signal (RS) configuration, waiting until configuration of corresponding quasi-co-located BFD RS is complete, and utilizing the configured and quasi-co-located BFD RS for beam failure detection.

Other aspects of the present disclosure include apparatuses having a memory, a transceiver, and one or more processors communicatively coupled with the memory and the transceiver, the one or more processors are configured to perform the steps of receiving a beam failure detection reference signal configuration, waiting until configuration of a corresponding quasi-co-located BFD RS is complete, and utilizing the configured and quasi-co-located BFD RS for beam failure detection.

Some aspects of the present disclosure include non-transitory computer readable media having instructions stored therein that, when executed by one or more processors, cause the one or more processors to perform the steps of receiving a beam failure detection reference signal configuration, waiting until configuration of a corresponding quasi-co-located BFD RS is complete, and utilizing the configured and quasi-co-located BFD RS for beam failure detection.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and the description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
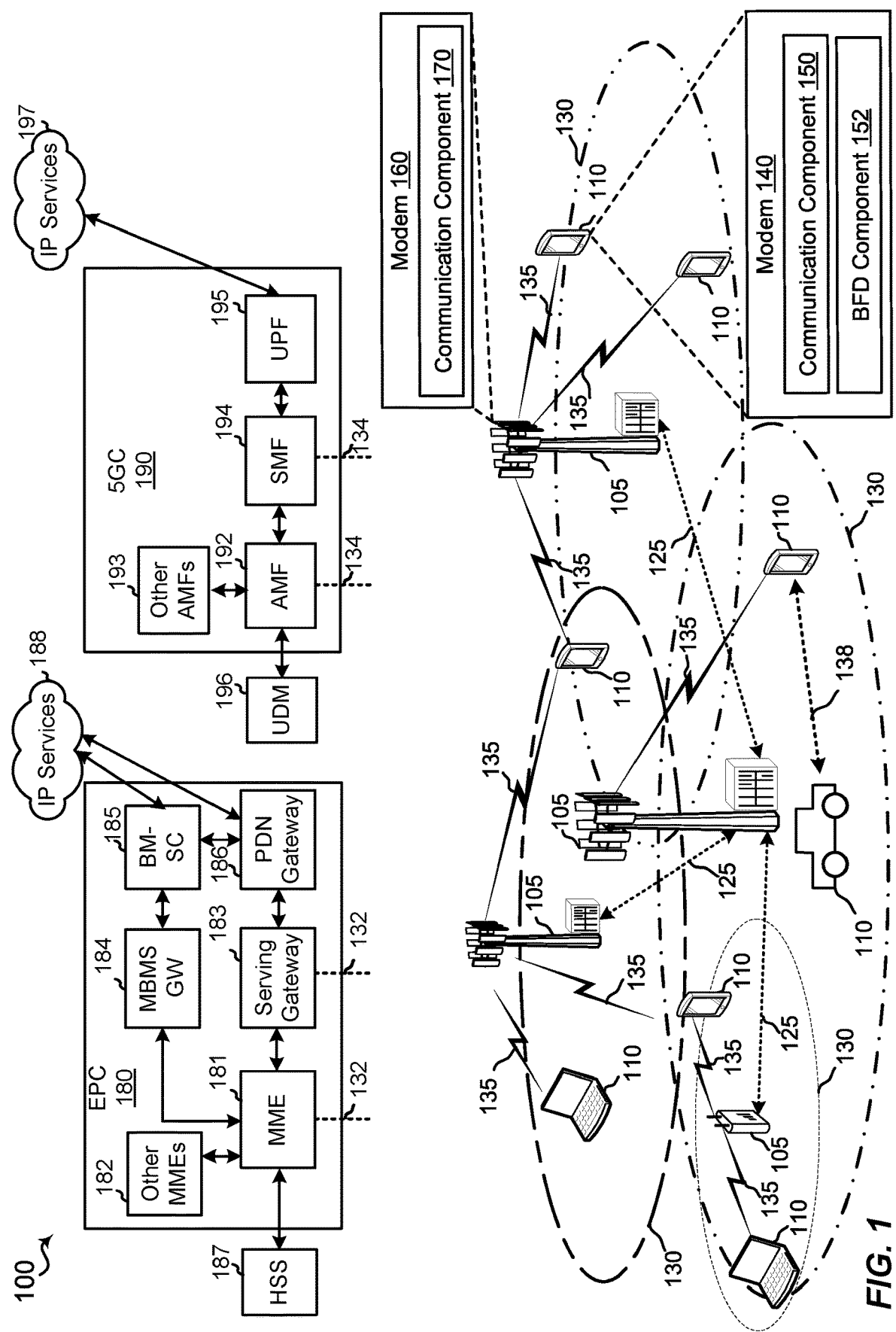
FIG. 1 is a schematic diagram of an example of a wireless communication network including at least one user equipment.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout the disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium, such as a computer storage media. Storage media may be any available media that may be accessed by a computer. By way of example, and not limitation, such computer-readable media may comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 902.11 (Wi-Fi), IEEE 902.16 (WiMAX), IEEE 902.20, Flash-OFDM™, etc. UTRA and E-UTRA are part of Universal Mobile Telecommunication System (UMTS). 3GPP Long Term Evolution (LTE) and LTE- Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A and/or 5G New Radio (NR) system for purposes of example, and LTE or 5G NR terminology is used in much of the description below, although the techniques are applicable beyond LTE/LTE-A and 5G NR applications, e.g., to other next generation communication systems).

In some aspects, a UE may be explicitly configured with a set of beam failure detection (BFD) reference signals (RS). For example, the UE may be provided, by a serving cell, with a set q0 of periodic channel state information (CSI) RS resource configuration indexes by higher layer parameter failureDetectionResources. If configured, the UE may use configured BFD RSs quasi-co-located (QCLed) with monitored control resource sets (CORESETs) for beam failure detection. For the set q0, the UE may assess the radio link quality according to periodic CSI-RS resource configurations or synchronization signal/physical broadcast channel (SS/PBCH) blocks that are quasi co-located with the demodulation reference signal (DM-RS) of physical downlink control channel (PDCCH) receptions monitored by the UE.

In certain aspects, if no explicit BFD RS configuration exists, the UE may implicitly determine the set of BFD RS. For example, if the UE is not provided with higher layer parameter failureDetectionResources, the UE may determine the set to include the SS/PBCH block indexes and periodic CSI-RS resource configuration indexes with the same values as the RS indexes in the RS sets indicated by the transmission configuration indicator (TCI) states for respective control resource sets that the UE uses for monitoring PDCCH.

In some aspects, insufficient number of the configured BFD RSs may be QCLed with a monitored CORESET. In one example, the CORESET may be newly reconfigured, e.g. by media access control (MAC) control element (CE), but the configuration of the corresponding QCLed BFD RS may not have been initiated or completed due to radio resource control (RRC) configuration latency. In another example, the number of monitored CORESET (e.g., 3 per bandwidth part (BWP)) may exceed the maximal configured BFD RS number (e.g., 2 per BWP).

In some aspects, when some monitored CORESET(s) includes configured QCLed BFD RSs while other monitored CORESET(s) do not, the UE may incorrectly detect a beam failure event if the configured QCLed BFD RSs have poor quality, even if other monitored CORESETs still have good quality (e.g., hypothetic block error rate (BLER) falls below a predetermined threshold).

In other aspects, when none of configured QCLed BFD RSs is QCLed with any monitored CORESET, the UE may not be able to properly perform beam failure detection, and a beam failure event may not be announced even if all monitored CORESETS have poor quality.

In some aspects, if there is an explicit BFD RS configuration, but a monitored CORESET does not include a configured and QCLed BFD RS, the UE may use the RS(s) indicated in CORESET TCI state for BFD (e.g., at least the RS providing TypeD QCL info). Here, the UE may use the RS(s) when it is in the SS block and/or periodic CSI-RS. Alternatively, the UE may use the RS(s) when none of the monitored CORESETs has configured and QCLed BFD RS.

In other aspects, if there is an explicit BFD RS configuration, but a monitored CORESET does not include configured and QCLed BFD RS, the UE may use the DM-RS of the CORESET or decode the statistics of PDCCH carried by the CORESET to evaluate the CORESET quality for BFD.

In certain aspects, a MAC CE based BFD RS configuration/reconfiguration may be introduced to reduce the latency of RRC configuration/reconfiguration. The CORESET and corresponding QCLed BFD-RS may be configured/reconfigured simultaneously by a single MAC-CE or multiple MAC-CEs in a same frame, or in different frames but close in time (e.g., in adjacent slots of the resource elements).

In other aspects, for example, if there is explicit BFD RS configuration, a CORESET may not be used until the configuration of the corresponding QCLed BFD RS is completed.

Referring to FIG. 1, in accordance with various aspects of the present disclosure, a wireless communication network 100 includes at least one UE 110 including a modem 140. The modem 140 may include a communication component 150 configured to communicate with the other UEs 110 and/or base stations 105, such as sending/receiving messages to the other UEs 110 and/or base stations 105. The modem 140 may include a BFD component 152 configured to detect a beam failure event using resources available to the UE 110.

The wireless network may include at least one base station 105 including a modem 160. The modem 160 may include a communication component 170 configured to communicate with one or more UEs 110 and/or other base stations 105, such as sending/receiving messages to the UEs 110 and/or other base stations 105.

The modem 160 of a base station 105 may be configured to communicate with other base stations 105 and UEs 110 via a cellular network, a Wi-Fi network, or other wireless and wired networks. The modem 140 of a UE 110 may be configured to communicate with the base stations 105 via a cellular network, a Wi-Fi network, or other wireless and wired networks. The modems 140, 160 may receive and transmit data packets.

The wireless communication network 100 may include one or more base stations 105, one or more UEs 110, and a core network, such as an Evolved Packet Core (EPC) 180 and/or a 5G core (5GC) 190. The EPC 180 and/or the 5GC 190 may provide user authentication, access authorization, tracking, internet protocol (IP) connectivity, and other access, routing, or mobility functions. The base stations 105 configured for 4G LTE (collectively referred to as Evolved Universal Mobile Telecommunications System (UMTS) Terrestrial Radio Access Network (E-UTRAN)) may interface with the EPC 180 through backhaul links 132 (e.g., S1, etc.). The base stations 105 configured for 5G NR (collectively referred to as Next Generation RAN (NG-RAN)) may interface with the 5GC 190 through backhaul links 134. In addition to other functions, the base stations 105 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 105 may communicate with each other directly or indirectly (e.g., through the EPC 180 or the 5GC 190), with one another over backhaul links 125, 132, or 134 (e.g., Xn, X1, or X2 interfaces). The backhaul links 125, 132, 134 may be wired or wireless communication links.

The base stations 105 may wirelessly communicate with the UEs 110 via one or more antennas. Each of the base stations 105 may provide communication coverage for a respective geographic coverage area 130. In some examples, the base stations 105 may be referred to as a base station, a radio base station, an access point (AP), an access node, a radio transceiver, a NodeB, eNodeB (eNB), gNodeB (gNB), Home NodeB, a Home eNodeB, a relay, a transceiver function, a basic service set (BSS), an extended service set (ESS), a transmit reception point (TRP), or some other suitable terminology. The geographic coverage area 130 for a base station 105 may be divided into sectors or cells making up only a portion of the coverage area (not shown). The wireless communication network 100 may include base stations 105 of different types (e.g., macro cell base stations or small cell base stations, described below). Additionally, the plurality of base stations 105 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a NR or 5G technology, a LTE or LTE-Advanced (LTE-A) or MuLTEfire technology, a Wi-Fi technology, a Bluetooth technology, or any other long or short range wireless communication technology. In LTE/LTE-A/MuLTEfire networks, the term evolved node B (eNB) may be generally used to describe the base stations 105, while the term UE may be generally used to describe the UEs 110. The wireless communication network 100 may be a heterogeneous technology network in which different types of eNBs provide coverage for various geographical regions. For example, each eNB or base station 105 may provide communication coverage for a macro cell, a small cell, or other types of cell.

A macro cell may generally cover a relatively large geographic area (e.g., several kilometers in radius) and may allow unrestricted access by UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by UEs 110 with service subscriptions with the network provider. A femto cell may also cover a small geographic area (e.g., a home) and may provide restricted access and/or unrestricted access by UEs 110 having an association with the femto cell (e.g., in the restricted access case, UEs 110 in a closed subscriber group (CSG) of the base station 105, which may include UEs 110 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARQ) to provide retransmission at the MAC layer to improve link efficiency. In the control plane, the RRC protocol layer may provide establishment, configuration, and maintenance of an RRC connection between a UE 110 and the base stations 105. The RRC protocol layer may also be used for the EPC 180 or the 5GC 190 support of radio bearers for the user plane data. At the physical (PHY) layer, the transport channels may be mapped to physical channels.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Some non-limiting examples of UEs 110 may include a session initiation protocol (SIP) phone, a satellite radio, a global positioning system, a multimedia device, a video device, a digital audio player (e.g., MP3 player), a camera, a game console, a smart device, a wearable device, a vehicle, an electric meter, a gas pump, a large or small kitchen appliance, a healthcare device, an implant, a sensor/actuator, a display, or any other similar functioning device. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. Some examples of IoT devices may include parking meter, gas pump, toaster, vehicles, and heart monitor. A UE 110 may be able to communicate with various types of base stations 105 and network equipment including macro eNBs, small cell eNBs, macro gNBs, small cell gNBs, relay base stations, and the like.

UE 110 may be configured to establish one or more wireless communication links 135 with one or more base stations 105. The wireless communication links 135 shown in wireless communication network 100 may carry uplink (UL) transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bidirectional communications using FDD (e.g., using paired spectrum resources) or TDD operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ MIMO techniques that may take advantage of multi-path environments to transmit multiple spatial layers carrying the same or different coded data.

Wireless communication network 100 may support operation on multiple cells or carriers, such as carrier aggregation (CA) or multi-carrier operation. The terms "carrier," "component carrier," "cell," and "channel" may be used interchangeably herein. A UE 110 may be configured with multiple downlink component carriers (CCs) and one or more uplink CCs for carrier aggregation. Carrier aggregation may be used with both FDD and TDD component carriers. The communication links 135 may use multiple-input and multiple-output (MIMO) antenna technology, including spatial multiplexing, beamforming, and/or transmit diversity. The base stations 105 and/or UEs 110 may use spectrum up to Y MHz (e.g., 5, 10, 15, 20, 30, 50, 100, 200, 400, etc., MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 110 may communicate with each other using device-to-device (D2D) communication link 138. The D2D communication link 138 may use the DL/UL WWAN spectrum. The D2D communication link 138 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications network 100 may further include base stations 105 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

The small cell may operate in a licensed and/or an unlicensed frequency spectrum. When operating in an unlicensed frequency spectrum, the small cell may employ NR and use the same 5 GHz unlicensed frequency spectrum as used by the Wi-Fi AP. The small cell, employing NR in an unlicensed frequency spectrum, may boost coverage to and/or increase capacity of the access network.

A base station 105, whether a small cell or a large cell (e.g., macro base station), may include an eNB, gNodeB (gNB), or other type of base station. Some base stations 105, such as a gNB may operate in a traditional sub 6 GHz spectrum, in millimeter wave (mmW) frequencies and/or near mmW frequencies in communication with the UE 110. When the gNB, such as a base station 105 operates in mmW or near mmW frequencies, the base station 105 may be referred to as an mmW base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, and may also be referred to as centimeter wave. Communications using the mmW and/or near mmW radio frequency band has extremely high path loss and a short range. The mmW base station 105 may utilize beamforming with the UEs 110 in their transmissions to compensate for the extremely high path loss and short range.

In a non-limiting example, the EPC 180 may include a Mobility Management Entity (MME) 181, other MMEs 182, a Serving Gateway 183, a Multimedia Broadcast Multicast Service (MBMS) Gateway 184, a Broadcast Multicast Service Center (BM-SC) 185, and a Packet Data Network (PDN) Gateway 186. The MME 181 may be in communication with a Home Subscriber Server (HSS) 187. The MME 181 is the control node that processes the signaling between the UEs 110 and the EPC 180. Generally, the MME 181 provides bearer and connection management. All user Internet protocol (IP) packets are transferred through the Serving Gateway 183, which itself is connected to the PDN Gateway 186. The PDN Gateway 186 provides UE IP address allocation as well as other functions. The PDN Gateway 186 and the BM-SC 185 are connected to the IP Services 188. The IP Services 188 may include the Internet, an intranet, an IP Multimedia Subsystem (IMS), a PS Streaming Service, and/or other IP services. The BM-SC 185 may provide functions for MBMS user service provisioning and delivery. The BM-SC 185 may serve as an entry point for content provider MBMS transmission, may be used to authorize and initiate MBMS Bearer Services within a public land mobile network (PLMN), and may be used to schedule MBMS transmissions. The MBMS Gateway 184 may be used to distribute MBMS traffic to the base stations 105 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 110 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

Figure 2:
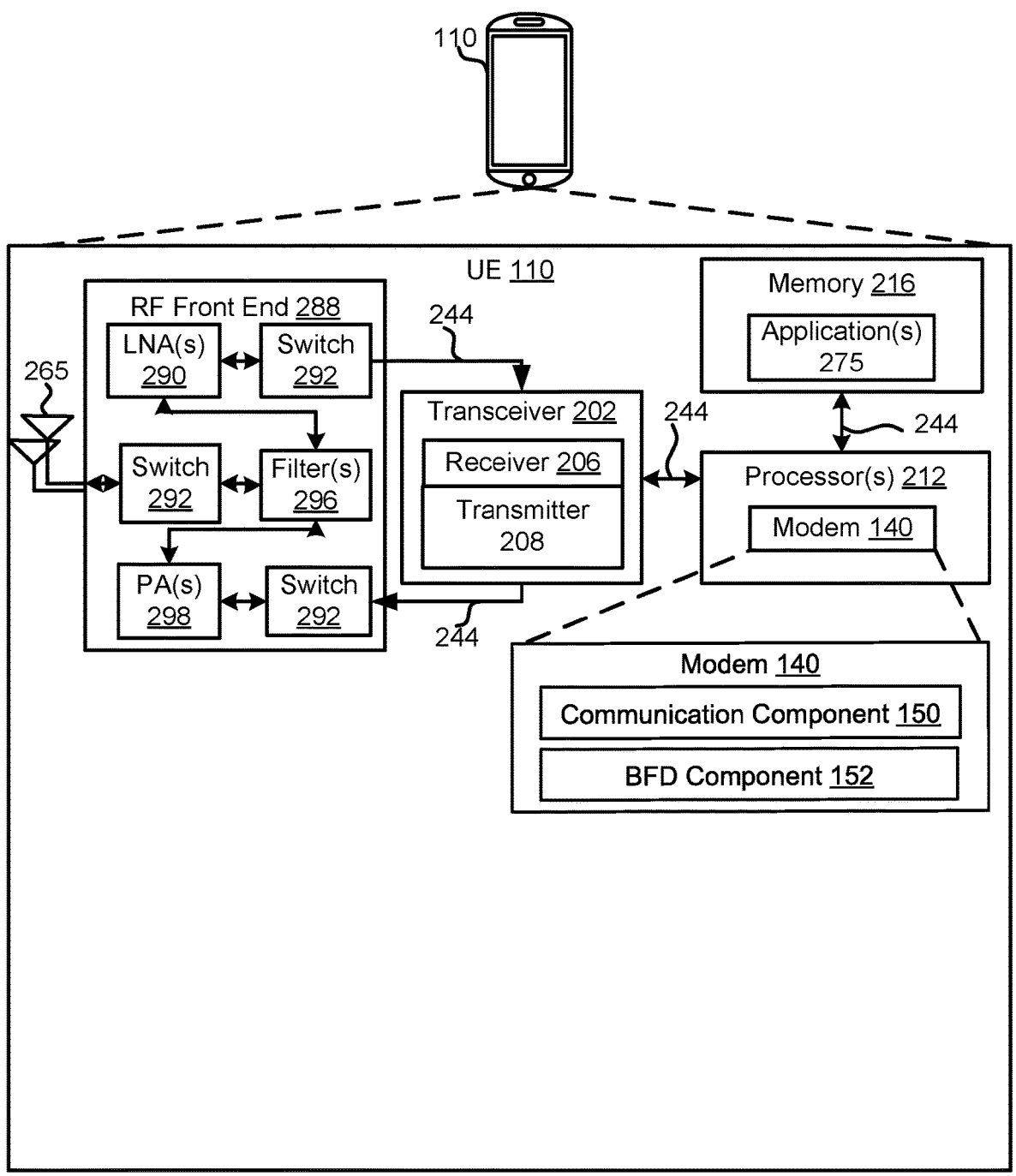
FIG. 2 is a schematic diagram of an example of a user equipment.

Referring to FIG. 2, one example of an implementation of the UE 110 may include a variety of components, some of which have already been described above, but including components such as one or more processors 212 and memory 216 and transceiver 202 in communication via one or more buses 244, which may operate in conjunction with the modem 140, the communication component 150, and/or the BFD component 152 to enable one or more of the functions described herein related to communicating with the base station 105. Further, the one or more processors 212, modem 140, memory 216, transceiver 202, RF front end 288 and one or more antennas 265, may be configured to support voice and/or data calls (simultaneously or non-simultaneously) in one or more radio access technologies. The one or more antennas 265 may include stand-alone antennas and/or antenna arrays.

In an aspect, the one or more processors 212 may include the modem 140 that uses one or more modem processors. The various functions related to the communication component 150 and the BFD component 152 may be included in the modem 140 and/or processors 212 and, in an aspect, may be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. Additionally, the modem 140 may configure the UE 110 along with the BFD component 152 and the processors 212. In other aspects, some of the features of the one or more processors 212 and/or the modem 140 associated with the communication component 150 may be performed by transceiver 202.

Also, memory 216 may be configured to store data used herein and/or local versions of applications 275 or the communication component 150 and/or one or more subcomponents of the communication component 150 being executed by at least one processor 212. Memory 216 may include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining the communication component 150 and/or one or more of its subcomponents, and/or data associated therewith, when UE 110 is operating at least one processor 212 to execute the communication component 150 and the BFD component 152 and/or one or more of their subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 105. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 110 may include RF front end 288, which may operate in communication with one or more antennas 265 and transceiver 202 for receiving and transmitting radio transmissions, for example, wireless communications transmitted by at least one base station 105 or wireless transmissions transmitted by UE 110. RF front end 288 may be coupled with one or more antennas 265 and may include one or more low-noise amplifiers (LNAs) 290, one or more switches 292, one or more power amplifiers (PAs) 298, and one or more filters 296 for transmitting and receiving RF signals.

In an aspect, LNA 290 may amplify a received signal at a desired output level. In an aspect, each LNA 290 may have a specified minimum and maximum gain values. In an aspect, RF front end 288 may use one or more switches 292 to select a particular LNA 290 and the specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and the specified gain value based on a desired gain value for a particular application.

Also, for example, one or more filters 296 may be used by RF front end 288 to filter a received signal to obtain an input RF signal. Similarly, in an aspect, for example, a respective filter 296 may be used to filter an output from a respective PA 298 to produce an output signal for transmission. In an aspect, each filter 296 may be coupled with a specific LNA 290 and/or PA 298. In an aspect, RF front end 288 may use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 110 may communicate with, for example, one or more base stations 105 or one or more cells associated with one or more base stations 105. In an aspect, for example, the modem 140 may configure transceiver 202 to operate at a specified frequency and power level based on the UE configuration of the UE 110 and the communication protocol used by the modem 140.

In an aspect, the modem 140 may be a multiband-multimode modem, which may process digital data and communicate with transceiver 202 such that the digital data is sent and received using transceiver 202. In an aspect, the modem 140 may be multiband and be configured to support multiple frequency bands for a specific communications protocol. In an aspect, the modem 140 may be multimode and be configured to support multiple operating networks and communications protocols. In an aspect, the modem 140 may control one or more components of UE 110 (e.g., RF front end 288, transceiver 202) to enable transmission and/or reception of signals from the network based on a specified modem configuration. In an aspect, the modem configuration may be based on the mode of the modem and the frequency band in use. In another aspect, the modem configuration may be based on UE configuration information associated with UE 110 as provided by the network.

Figure 3:
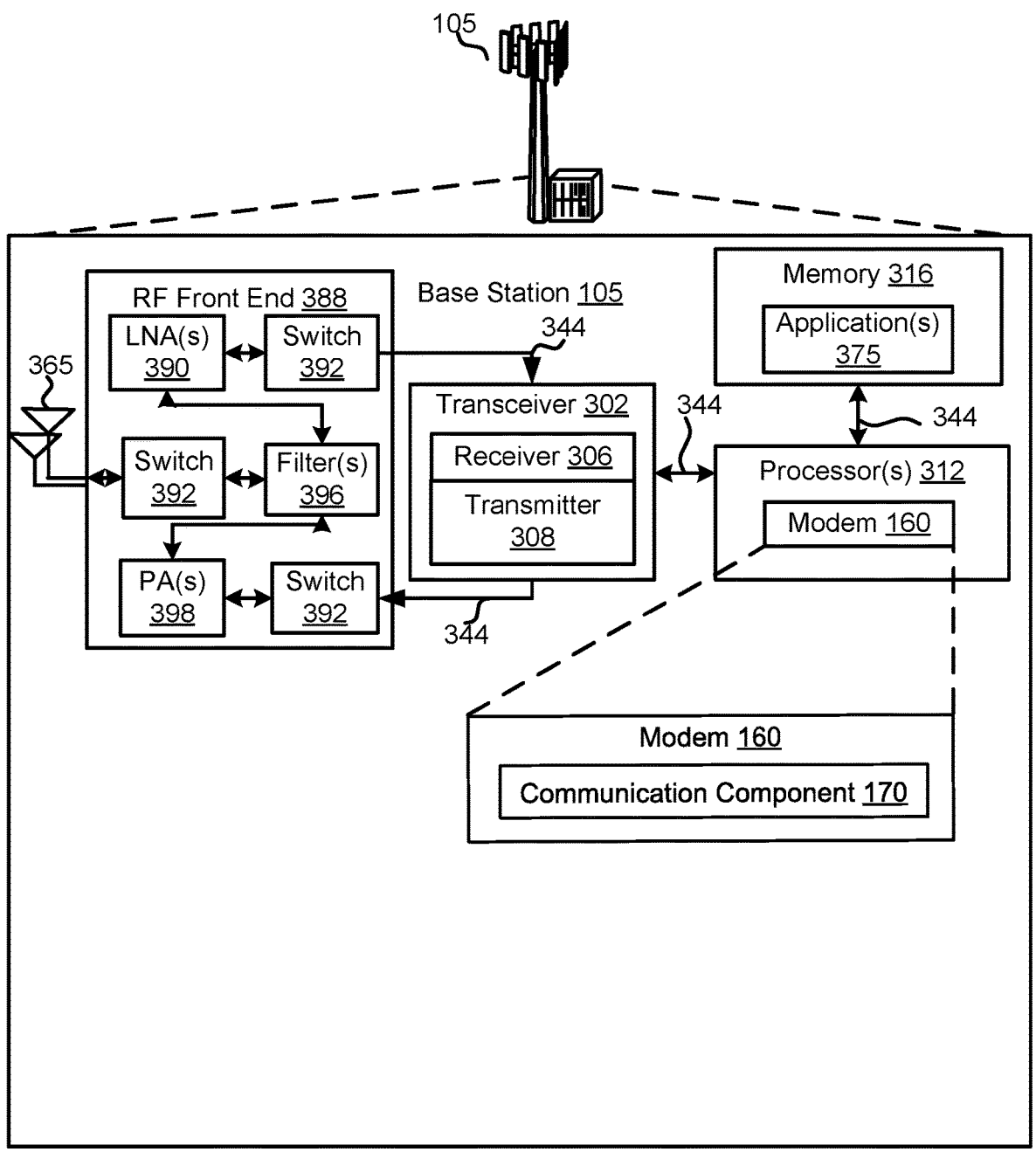
FIG. 3 is a schematic diagram of an example of a base station.

Referring to FIG. 3, one example of an implementation of may include a variety of components, some of which have already been described above, but including components such as one or more processors 312 and memory 316 and transceiver 302 in communication via one or more buses 344, which may operate in conjunction with the modem 160 and the communication component 170 to enable one or more of the functions described herein related to communicating with the UE 110. Further, the one or more processors 312, modem 160, memory 316, transceiver 302, RF front end 388 and one or more antennas 365, may be configured to support voice and/or data calls (simultaneously or non-simultaneously) in one or more radio access technologies. The one or more antennas 365 may include stand-alone antennas and/or antenna arrays.

In an aspect, the one or more processors 312 may include the modem 160 that uses one or more modem processors. The various functions related to the communication component 170 may be included in the modem 160 and/or processors 312 and, in an aspect, may be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiver processor, or a transceiver processor associated with transceiver 302. Additionally, the modem 160 may configure the base station 105 and processors 312. In other aspects, some of the features of the one or more processors 312 and/or the modem 160 associated with the communication component 170 may be performed by transceiver 302.

Also, memory 316 may be configured to store data used herein and/or local versions of applications 375 or the communication component 160 and/or one or more subcomponents of the communication component 160 being executed by at least one processor 312. Memory 316 may include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining the communication component 170 and/or one or more of its subcomponents, and/or data associated therewith, when the base station 105 is operating at least one processor 312 to execute the communication component 170 and/or one or more of the subcomponents.

Transceiver 302 may include at least one receiver 306 and at least one transmitter 308. The at least one receiver 306 may include hardware, firmware, and/or software code executable by a processor for receiving data, the code comprising instructions and being stored in a memory (e.g., computer-readable medium). Receiver 306 may be, for example, a radio frequency (RF) receiver. In an aspect, receiver 306 may receive signals transmitted by the UE 110. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, the base station 105 may include RF front end 388, which may operate in communication with one or more antennas 365 and transceiver 302 for receiving and transmitting radio transmissions, for example, wireless communications transmitted by other base stations 105 or wireless transmissions transmitted by UE 110. RF front end 388 may be coupled with one or more antennas 365 and may include one or more low-noise amplifiers (LNAs) 390, one or more switches 392, one or more power amplifiers (PAs) 398, and one or more filters 396 for transmitting and receiving RF signals.

In an aspect, LNA 390 may amplify a received signal at a desired output level. In an aspect, each LNA 390 may have a specified minimum and maximum gain values. In an aspect, RF front end 388 may use one or more switches 392 to select a particular LNA 390 and the specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and the specified gain value based on a desired gain value for a particular application.

Also, for example, one or more filters 396 may be used by RF front end 388 to filter a received signal to obtain an input RF signal. Similarly, in an aspect, for example, a respective filter 396 may be used to filter an output from a respective PA 398 to produce an output signal for transmission. In an aspect, each filter 396 may be coupled with a specific LNA 390 and/or PA 398. In an aspect, RF front end 388 may use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that base station 105 may communicate with, for example, the UE 110 or one or more cells associated with one or more base stations 105. In an aspect, for example, the modem 160 may configure transceiver 302 to operate at a specified frequency and power level based on the base station configuration of the base station 105 and the communication protocol used by the modem 160.

In an aspect, the modem 160 may be a multiband-multimode modem, which may process digital data and communicate with transceiver 302 such that the digital data is sent and received using transceiver 302. In an aspect, the modem 160 may be multiband and be configured to support multiple frequency bands for a specific communications protocol. In an aspect, the modem 160 may be multimode and be configured to support multiple operating networks and communications protocols. In an aspect, the modem 160 may control one or more components of the base station 105 (e.g., RF front end 388, transceiver 302) to enable transmission and/or reception of signals from the network based on a specified modem configuration. In an aspect, the modem configuration may be based on the mode of the modem and the frequency band in use. In another aspect, the modem configuration may be based on base station configuration associated with the base station 105.

Figure 4:
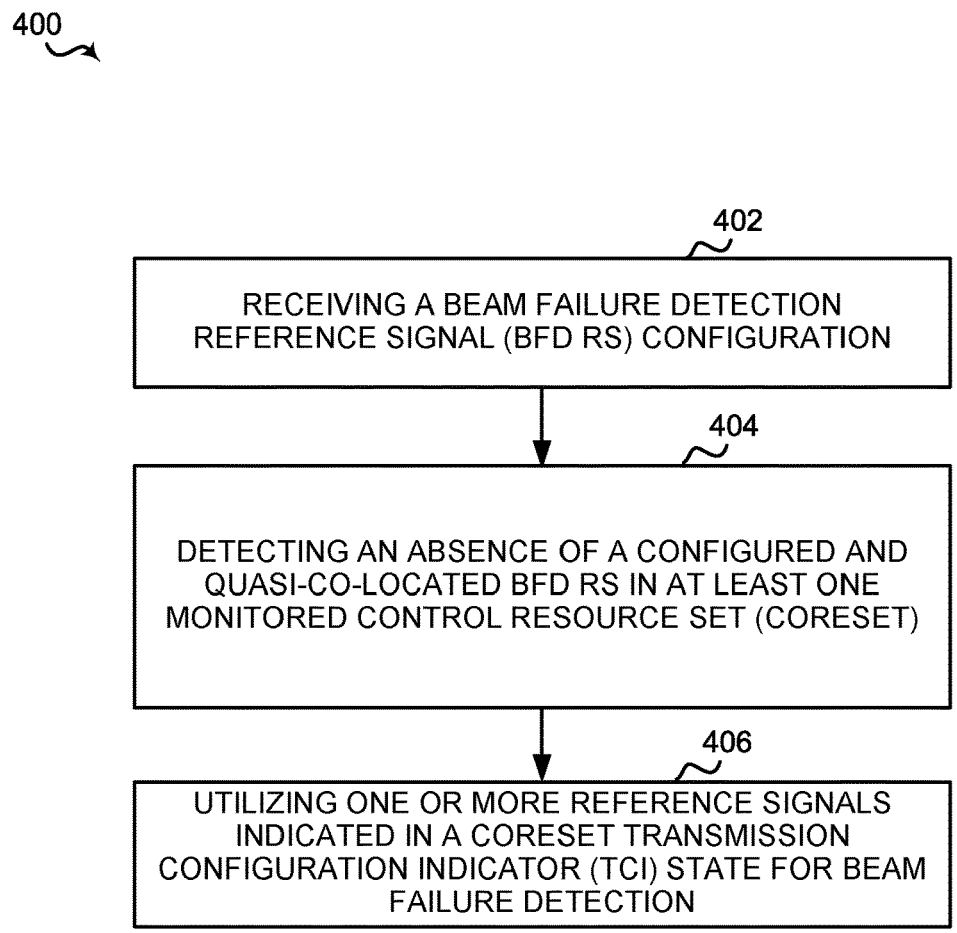
FIG. 4 is a process flow diagram of an example of a method for performing enhanced beam failure detection using reference signals indicated in a CORESET.

Turning now to FIG. 4, the UE 110 may perform an example of a method 400 of wireless communications including beam failure detection using reference signals indicated in the control resource set.

At block 402, the method 400 may perform the step of receiving a beam failure detection reference signal configuration. For example, the communication component 150 of the UE 110 may receive a beam failure detection reference signal configuration transmitted by the communication components 170 of the base station 105. The one or more antennas 265 of the UE 110 may receive electro-magnetic signals associated with the beam failure detection reference signal configuration. The RF front end 288 of the UE 110 may filter, amplify, and/or extract electrical signals carried by the electro-magnetic signals. The transceiver 202 or the receiver 206 of the UE 110 may digitize and convert the electrical signals into data, such as the beam failure detection reference signal configuration, and send to the communication component 222 of the UE 110.

At block 404, the method 400 may perform the step of detecting an absence of a configured and quasi-co-located BFD RS in at least one monitored control resource set. For example, the BFD component 152 of the UE 110 may detect an absence of a configured and quasi-co-located BFD RS in at least one monitored control resource set.

In some implementations, the at least one monitored control resource set may be configured by one or more MAC CEs.

In some implementations, detecting the absence may include detecting an incomplete configuration of the configured and quasi-co-located BFD RS. The incomplete configuration may indicate that the configuration of the quasi-co-located BFD RS has not been initiated or has not been completed.

In some implementations, the incomplete configuration may be caused by a RRC configuration latency. The UE 110 may receive at least one MAC CE and configure the at least one monitored CORESET or the configured and quasi-co-located BFD RS to reduce the RRC configuration latency.

In some implementations, configuring the at least one monitored CORESET or the configured and quasi-co-located BFD RS may include configuring the at least one monitored CORESET or the configured and quasi-co-located BFD RS in a same frame or different frames close in time. A non-limiting example of different frames close in time may include frames that differ by 1 microsecond (μs), 5 μs, 10 μs, 50 μs, 100 μs, 500 μs, or 1 millisecond (ms) in time.

In some implementations, detecting the absence may include determining a number of the at least one monitored CORESET is larger than a number of the BFD RS. For example, the UE 1109 may detect the absence by determining that there are three monitored CORESET and two configured BFD RSs.

At block 406, the method 400 may perform the step of utilizing one or more reference signals indicated in a CORESET transmission configuration indicator state for beam failure detection. For example, the communication component 150 and/or the BFD component 152 of the UE 110 may utilize reference signals indicated in the CORESET transmission configuration indicator state for beam failure detection. In some examples, the UE 110 may utilize the one or more RSs in the CORESET transmission configuration indicator state for beam failure detection by evaluating the quality of the RSs (e.g., signal strength, signal to noise-plus-interference ratio, signal to noise ratio, bit error rate, block error rate, etc.). If the quality of the RSs degrade below a predetermined threshold, the UE 110 may determine a beam failure has occurred. For example, if the one or more RSs in the CORESET has a signal to noise-plus-interference ratio of 0.5 dB, and the predetermined threshold is 1 dB, the UE 110 may determine a beam failure event has occurred.

Figure 5:
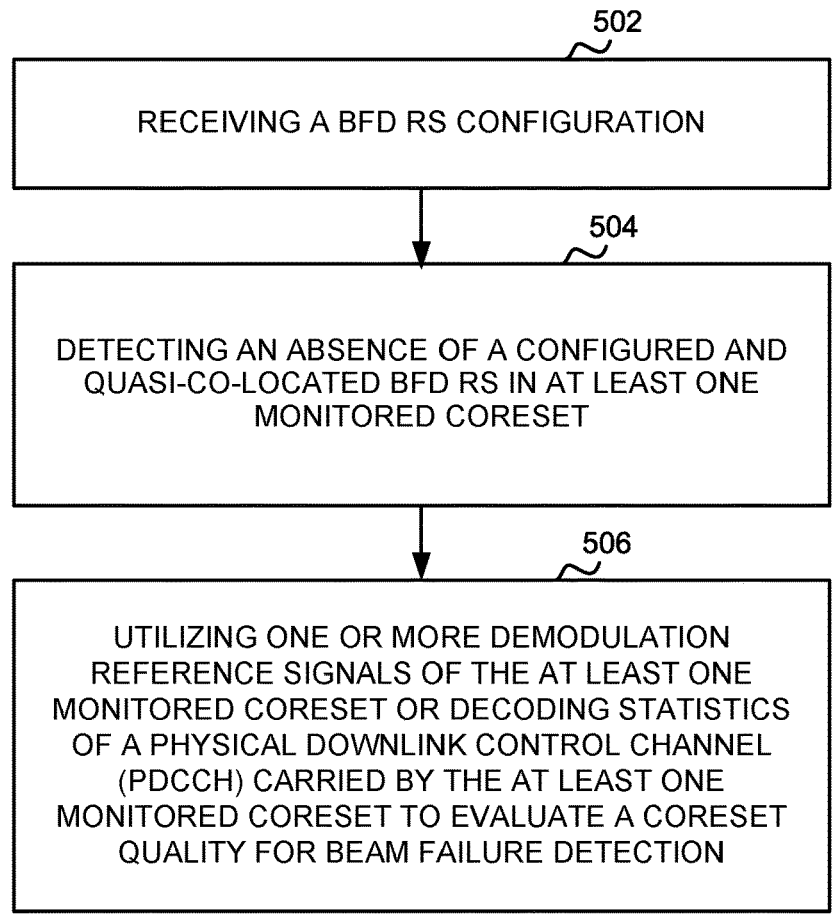
FIG. 5 is a process flow diagram of an example of a method for performing enhanced beam failure detection using demodulation reference signals of a CORESET.

Turning now to FIG. 5, the UE 110 may perform an example of a method 500 of wireless communications including beam failure detection using the demodulation reference signals of the control resource set.

At block 502, the method 500 may perform the step of receiving a BFD RS configuration. For example, the communication component 150 of the UE 110 may receive a BFD RS configuration transmitted by the communication components 170 of the base station 105. The one or more antennas 265 of the UE 110 may receive electro-magnetic signals associated with the beam failure detection reference signal configuration. The RF front end 288 of the UE 110 may filter, amplify, and/or extract electrical signals carried by the electro-magnetic signals. The transceiver 202 or the receiver 206 of the UE 110 may digitize and convert the electrical signals into data, such as the beam failure detection reference signal configuration, and send to the communication component 222 of the UE 110.

At block 504, the method 500 may perform the step of detecting an absence of a configured and quasi-co-located BFD RS in at least one monitored CORESET. For example, the BFD component 152 of the UE 110 may detect an absence of a configured and quasi-co-located BFD RS in at least one monitored CORESET.

In some implementations, the at least one monitored control resource set may be configured by one or more MAC CEs.

In some implementations, detecting the absence may include detecting an incomplete configuration of the configured and quasi-co-located BFD RS. The incomplete configuration may indicate that the configuration of the quasi-co-located BFD RS has not been initiated or has not been completed.

In some implementations, the incomplete configuration may be caused by a RRC configuration latency. The UE 110 may receive at least one MAC CE and configure the at least one monitored CORESET or the configured and quasi-co-located BFD RS to reduce the RRC configuration latency.

In some implementations, configuring the at least one monitored CORESET or the configured and quasi-co-located BFD RS may include configuring the at least one monitored CORESET or the configured and quasi-co-located BFD RS in a same frame or different frames close in time. A non-limiting example of different frames close in time may include frames that differ by 1 microsecond (μs), 5 μs, 10 μs, 50 μs, 100 μs, 500 μs, or 1 millisecond (ms) in time.

In some implementations, detecting the absence may include determining a number of the at least one monitored CORESET is larger than a number of the BFD RS. For example, the UE 1109 may detect the absence by determining that there are three monitored CORESET and two configured BFD RSs.

At block 506, the method 500 may perform the step of utilizing demodulation reference signals of the at least one monitored CORESET or decoding statistics of a PDCCH by the at least one monitored CORESET to evaluate a CORESET quality for beam failure detection. For example, the BFD component 152 of the UE 110 may utilize demodulation reference signals of the at least one monitored CORESET or decoding statistics of a PDCCH carried by the at least one monitored CORESET to evaluate a CORESET quality for beam failure detection.

Figure 6:
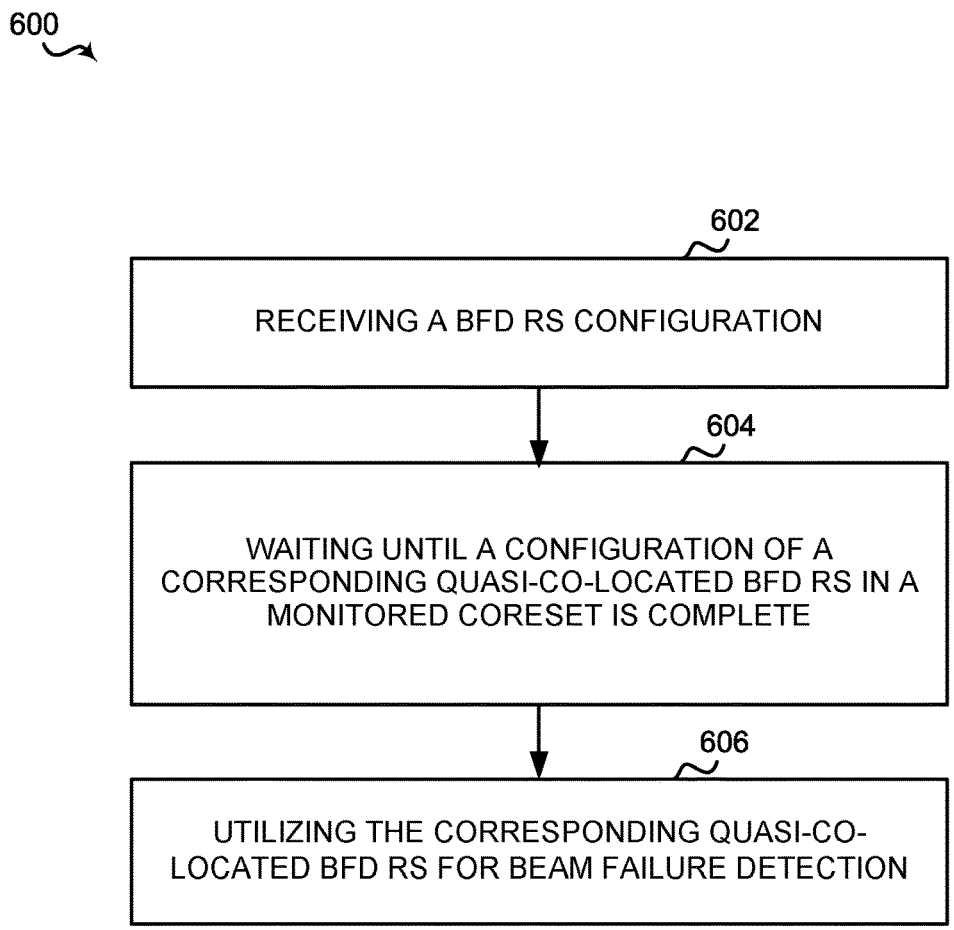
FIG. 6 is a process flow diagram of an example of a method for performing enhanced beam failure detection using a configured and quasi-co-located beam failure detection reference signals.

Turning now to FIG. 6, the UE 110 may perform an example of a method 600 of wireless communications including beam failure detection using configured and quasi-co-located beam failure detection reference signals.

At block 602, the method 600 may perform the step of receiving a BFD RS configuration. For example, the communication component 150 of the UE 110 may receive a BFD RS configuration transmitted by the communication components 170 of the base station 105. The one or more antennas 265 of the UE 110 may receive electro-magnetic signals associated with the beam failure detection reference signal configuration. The RF front end 288 of the UE 110 may filter, amplify, and/or extract electrical signals carried by the electro-magnetic signals. The transceiver 202 or the receiver 206 of the UE 110 may digitize and convert the electrical signals into data, such as the beam failure detection reference signal configuration, and send to the communication component 222 of the UE 110.

At block 604, the method 600 may perform the step of waiting until a configuration of corresponding quasi-co-located BFD RS is complete. For example, the BFD component 152 of the UE 110 may wait until configuration of corresponding quasi-co-located BFD RS is complete.

In some implementations, the UE 110 may perform the step of configuring, prior to utilizing the corresponding quasi-co-located BFD RS, at least one monitored CORESET or the corresponding quasi-co-located BFD RS using one or more medium access control (MAC) control elements (CEs). In some implementations, configuring the at least one monitored CORESET or the corresponding quasi-co-located BFD RS may include configuring the at least one monitored CORESET or the corresponding quasi-co-located BFD RS in a same frame or different frames close in time. A non-limiting example of different frames close in time may include frames that differ by 1 microsecond (µs), 5 µs, 10 µs, 50 µs, 100 µs, 500 µs, or 1 millisecond (ms) in time.

At block 606, the method 600 may perform the step of utilizing the configured and quasi-co-located BFD RS for beam failure detection. For example, the BFD component 152 of the UE 110 may utilize the configured and quasi-co-located BFD RS for beam failure detection.

In optional implementations, the UE 110 may configure, prior to utilizing the configured and quasi-co-located BFD RS, a CORESET and a corresponding quasi-co-located BFD RSs by one or more MAC CEs. For example, the BFD component 152 of the UE 110 may configure a CORESET and corresponding quasi-co-located BFD RSs by one or more MAC CEs to reduce the latency associated with RRC configuration and/or reconfiguration operations.

The above detailed description set forth above in connection with the appended drawings describes examples and does not represent the only examples that may be implemented or that are within the scope of the claims. The term "example," when used in the description, means "serving as an example, instance, or illustration," and not "preferred" or "advantageous over other examples." The detailed description includes specific details for the purpose of providing an understanding of the described techniques. These techniques, however, may be practiced without these specific details. For example, changes may be made in the function and arrangement of elements discussed without departing from the scope of the disclosure. Also, various examples may omit, substitute, or add various procedures or components as appropriate. For instance, the methods described may be performed in an order different from that described, and various steps may be added, omitted, or combined. Also, features described with respect to some examples may be combined in other examples. In some instances, well-known structures and apparatuses are shown in block diagram form in order to avoid obscuring the concepts of the described examples.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description herein, however, describes an LTE/LTE-A system or 5G system for purposes of example, and LTE terminology is used in much of the description below, although the techniques may be applicable other next generation communication systems.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method of wireless communication, comprising:
receiving a beam failure detection (BFD) reference signal (RS) configuration;
detecting an absence of a configured and quasi-co-located BFD RS associated with the BFD RS configuration in at least one monitored control resource set (CORESET), wherein detecting the absence comprises detecting an incomplete configuration of the configured and quasi-co-located BFD RS; and
utilizing one or more RSs indicated in a CORESET transmission configuration indicator (TCI) state for beam failure detection.

2. The method of claim 1, wherein the at least one monitored CORESET is configured by one or more medium access control (MAC) control elements (CEs).

3. The method of claim 1, wherein the incomplete configuration is caused by a radio resource control (RRC) configuration latency.

4. The method of claim 3, further comprises:
receiving at least one MAC CE; and
configuring the at least one monitored CORESET or the configured and quasi-co-located BFD RS to reduce the RRC configuration latency.

5. The method of claim 4, wherein configuring the at least one monitored CORESET or the configured and quasi-co-located BFD RS comprises configuring the at least one monitored CORESET or the configured and quasi-co-located BFD RS in a same frame or different frames.

6. The method of claim 1, wherein detecting the absence comprises determining a number of the at least one monitored CORESET is larger than a number of the BFD RS.

7. A method of wireless communication, comprising:
receiving a beam failure detection (BFD) reference signal (RS) configuration;
detecting an absence of a configured and quasi-co-located BFD RS associated with the BFD RS configuration in at least one monitored control resource set (CORESET), wherein detecting the absence comprises detecting an incomplete configuration of the configured and quasi-co-located BFD RS; and
utilizing one or more demodulation RSs of the at least one monitored CORESET or decoding statistics of a physical downlink control channel (PDCCH) carried by the at least one monitored CORESET to evaluate a CORESET quality for beam failure detection.

8. The method of claim 7, wherein the at least one monitored CORESET is configured by one or more medium access control (MAC) control element (CE).

9. The method of claim 7, wherein the incomplete configuration is caused by a radio resource control (RRC) configuration latency.

10. The method of claim 9, further comprises:
receiving at least one MAC CE; and
configuring the at least one monitored CORESET or the configured and quasi-co-located BFD RS to reduce the RRC configuration latency.

11. The method of claim 10, wherein configuring the at least one monitored CORESET or the configured and quasi-co-located BFD RS comprises configuring the at least one monitored CORESET or the configured and quasi-co-located BFD RS in a same frame or different frames.

12. The method of claim 7, wherein detecting the absence comprises determining a number of the at least one monitored CORESET is larger than a number of the BFD RS.

13. A method of wireless communication, comprising:
receiving a beam failure detection (BFD) reference signal (RS) configuration;
waiting until a configuration of a corresponding quasi-co-located BFD RS in a monitored control resource set (CORESET) is complete; and
utilizing the corresponding quasi-co-located BFD RS for beam failure detection in response to a completion of the configuration of the corresponding quasi-co-located BFD RS in the monitored CORESET.

14. The method of claim 13, further comprising:
configuring, prior to utilizing the corresponding quasi-co-located BFD RS, at least one monitored CORESET or the corresponding quasi-co-located BFD RS using one or more medium access control (MAC) control elements (CEs).

15. The method of claim 14, wherein configuring the at least one monitored CORESET or the corresponding quasi-co-located BFD RS comprises configuring the at least one monitored CORESET or the corresponding quasi-co-located BFD RS in a same frame or different frames.

16. A user equipment, comprising:
a memory;
a transceiver;
one or more processors operatively coupled with the memory and the transceiver, the one or more processors configured to perform the steps of:
receiving, via the transceiver, a beam failure detection (BFD) reference signal (RS) configuration;
detecting an absence of a configured and quasi-co-located BFD RS associated with the BFD RS configuration in at least one monitored control resource set (CORESET), wherein detecting the absence comprises detecting an incomplete configuration of the configured and quasi-co-located BFD RS; and
utilizing one or more RSs indicated in a CORESET transmission configuration indicator (TCI) state for beam failure detection.

17. The user equipment of claim 16, wherein the at least one monitored CORESET is configured by one or more medium access control (MAC) control elements (CEs).

18. The user equipment of claim 16, wherein the incomplete configuration is caused by a radio resource control (RRC) configuration latency.

19. The user equipment of claim 18, wherein the one or more processor is configured to perform the steps of:
receiving at least one MAC CE; and
configuring the at least one monitored CORESET or the configured and quasi-co-located BFD RS to reduce the RRC configuration latency.

20. The user equipment of claim 19, wherein configuring the at least one monitored CORESET or the configured and quasi-co-located BFD RS comprises configuring the at least one monitored CORESET or the configured and quasi-co-located BFD RS in a same frame or different frames.

21. The user equipment of claim 16, wherein detecting the absence comprises determining a number of the at least one monitored CORESET is larger than a number of the BFD RS.

* * * * *